(12) United States Patent
Carlson et al.

(10) Patent No.: US 6,692,011 B2
(45) Date of Patent: *Feb. 17, 2004

(54) MOBILE PEDESTAL WITH STORABLE HANDLE

(75) Inventors: Liisa Fink Carlson, Grand Haven, MI (US); John R. Hamilton, Grand Rapids, MI (US); Kevin B. Miller, Wayland, MI (US); Daniel A. Schurr, Wyoming, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/882,514

(22) Filed: Jun. 15, 2001

(65) Prior Publication Data

US 2002/0060439 A1 May 23, 2002

Related U.S. Application Data

(63) Continuation-in-part of application No. 09/690,025, filed on Oct. 16, 2000, now Pat. No. 6,474,665.

(51) Int. Cl.[7] .............................. B62B 1/00; B62B 5/00; B62B 7/00
(52) U.S. Cl. ................. 280/79.2; 280/655.1; 280/79.11
(58) Field of Search ................................ 280/37, 47.34, 280/47.35, 47.371, 79.11, 79.2, 651, 655.1; 190/18 A; 16/436, 437, 444, 405, 408, 113.1, 429, 442

(56) References Cited

U.S. PATENT DOCUMENTS

| 548,699 A | 10/1895 | Chichester |
| 1,049,331 A | 1/1913 | Bowser |
| 1,330,373 A | 2/1920 | Hall |

(List continued on next page.)

*Primary Examiner*—Brian L. Johnson
*Assistant Examiner*—Gerald B Klebe
(74) *Attorney, Agent, or Firm*—Price Heneveld Cooper Dewitt & Litton LLP (57) ABSTRACT

A mobile pedestal includes a wheeled cabinet unit with a cabinet made from sheet metal, and a cushioned upholstery-covered top subassembly attached to a top of the wheeled cabinet unit. The top subassembly includes a flat housing made of a wood product and that is shaped to substantially cover the cabinet. The housing defines a pair of edge-located elongated cavities. A U-shaped handle with elongated legs that extend into and slidably engage the cavities so that the handle is movable to an internal storage position in the cavities and to an extended angled use position. The legs have a turned-in end and the cavities are configured to engage the turned-in ends to retain the handle to the housing when the handle is in the extended use position, but further the legs are configured to permit the handle to rotate from a horizontal extended position to the angled use position when extended.

22 Claims, 7 Drawing Sheets

U.S. PATENT DOCUMENTS

| | | | |
|---|---|---|---|
| 1,829,629 A | | 10/1931 | Betancourt |
| 2,563,919 A | | 8/1951 | Christensen |
| 2,727,753 A | | 12/1955 | Johnson et al. |
| 2,783,053 A | | 2/1957 | Sheldrick et al. |
| 3,522,955 A | | 8/1970 | Warner, Jr. |
| 4,102,010 A | | 7/1978 | Lazazzero |
| 4,109,926 A | * | 8/1978 | Lane .......................... 280/39 |
| 4,118,048 A | | 10/1978 | Spranger et al. |
| 4,203,609 A | | 5/1980 | Mitchell et al. |
| 4,412,688 A | | 11/1983 | Giordani |
| 4,460,188 A | | 7/1984 | Maloof |
| 4,506,906 A | | 3/1985 | Alldén |
| 4,714,292 A | | 12/1987 | Kassai |
| 5,048,649 A | * | 9/1991 | Carpenter et al. ........ 190/18 A |
| D331,334 S | | 12/1992 | Hollington |
| 5,184,835 A | | 2/1993 | Huang |
| D336,706 S | | 6/1993 | Lechman et al. |
| 5,330,037 A | * | 7/1994 | Wang ....................... 190/18 A |
| 5,368,143 A | * | 11/1994 | Pond et al. ................ 190/18 A |
| 5,394,965 A | * | 3/1995 | Kho ............................ 190/115 |
| D357,781 S | | 4/1995 | Crinion |
| 5,435,423 A | * | 7/1995 | Rekuc et al. ............. 190/18 A |
| 5,474,483 A | | 12/1995 | Sun |
| D365,905 S | | 1/1996 | Yemini |
| 5,524,737 A | * | 6/1996 | Wang ....................... 190/18 A |
| 5,588,513 A | * | 12/1996 | Lin ............................. 190/115 |
| D391,031 S | | 2/1998 | Egan et al. |
| D391,396 S | | 3/1998 | Yemini |
| D391,732 S | | 3/1998 | Spear et al. |
| D404,873 S | | 1/1999 | Simons et al. |
| D407,578 S | | 4/1999 | Crinion |
| 5,915,723 A | | 6/1999 | Austin |
| 6,024,427 A | | 2/2000 | Underwood et al. |
| 6,267,393 B1 | * | 7/2001 | Mengone et al. ............. 280/37 |
| 6,471,010 B2 | * | 10/2002 | McCrandall et al. ........ 187/244 |
| 6,474,665 B1 | * | 11/2002 | Fink et al. ................. 280/79.2 |

\* cited by examiner

MOBILE PEDESTAL WITH STORABLE HANDLE

CROSS REFERENCE TO RELATED APPLICATION

The present application is a continuation-in-part of application Ser. No. 09/690,025, filed Oct. 16, 2000, now U.S. Pat. No. 6,474,665 B1, published Nov. 5, 2002, entitled MOBILE PEDESTAL WITH STORABLE HANDLE.

BACKGROUND OF INVENTION

The present invention relates to mobile pedestals, and more particularly relates to mobile pedestals having a storable handle.

Mobile pedestals are very useful in modern offices, since they provide portable storage necessary in many office environments. However, it is awkward to push or pull mobile pedestals, particularly when walking while moving them, since the mobile pedestals tend to have a low height that causes the person to bend over in order to push or pull them. Fixed handles have been used on mobile pedestals, but fixed handles tend to get in the way when the handles are not being used. Further, fixed handles can cause a cluttered appearance, which is not conducive to the clean uncluttered look desired by many furniture and office designers. Movable handles have been proposed, however, movable handles do not necessarily solve the "cluttered look" problem. Further, movable handles can undesirably add to manufacturing expense and warranty. Another problem is the many mobile pedestals already in existence that do not presently provide a handle, or that include a handle having one or more of the above problems.

Accordingly, an apparatus solving the aforementioned problems and having the aforementioned advantages is desired.

SUMMARY OF THE INVENTION

In one aspect of the present invention, a mobile pedestal includes a wheeled cabinet unit, and a top subassembly attached to a top of the wheeled cabinet unit. The top subassembly includes a housing shaped to cover the cabinet unit and that defines at least one cavity. The top subassembly further includes a handle operably attached to the housing and configured for movement to an internal storage position in the at least one cavity and to an extended use position for use.

In another aspect of the present invention, a subassembly is provided that is configured for attachment to a wheeled cabinet unit. The subassembly includes a housing having a cabinet-interfacing side that is adapted to stably engage and cover a portion of a cabinet unit. The housing defines at least one cavity, and a handle is operably attached to the housing that is configured for movement to an internal storage position in the at least one cavity and to an extended use position extending from the cavity.

In another aspect of the present invention, a mobile pedestal includes a wheeled cabinet unit with a cabinet made from sheet metal. A top subassembly is attached to a top of the wheeled cabinet unit. The top subassembly includes a housing made of a wood product or polymeric material that is shaped to substantially cover the cabinet unit. The housing defines at least one elongated cavity shaped to receive a handle. The top subassembly further includes a handle with elongated legs that extend into and slidably engage the at least one elongated cavity. The handle is operably attached to the housing and configured for movement to an internal storage position in the at least one cavity and to an extended use position. The legs have an end member and the at least one cavity is configured to engage the end member to retain the handle to the housing when the handle is in the extended use position but to permit the handle to rotate upwardly when in the extended use position.

In still another aspect of the present invention, a method comprises steps of providing a cabinet unit and providing a subassembly including a housing configured for attachment to the cabinet unit. The housing defines at least one cavity and includes a handle movable between a storage position in the at least one cavity and an extended use position. The method includes attaching the subassembly to the cabinet after manufacture of the cabinet unit. In a narrow form, the subassembly is retrofittably attached.

In still another aspect of the present invention, a mobile pedestal comprises a wheeled cabinet unit and a handle attached to the wheeled cabinet unit. The handle includes flexible material that bends as the handle is moved between a raised position and a lowered position.

These and other features, advantages, and objects of the present invention will be further understood and appreciated by those skilled in the art by reference to the following specification, claims and appended drawings.

DETAILED DESCRIPTION OF PREFERRED EMBODIMENT

Figure 1:
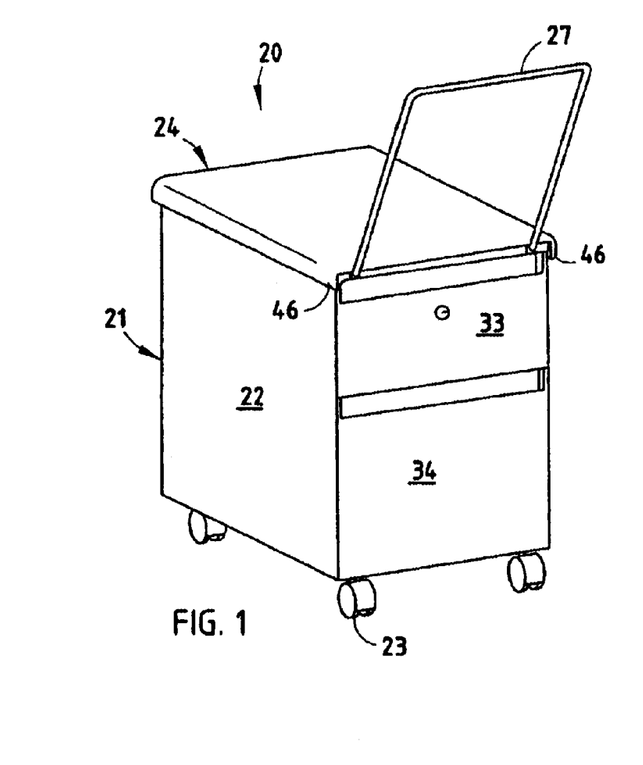
FIG. 1 is a perspective view of a mobile pedestal including a top subassembly embodying the present invention, including its handle, which is shown in an extended use position.
Figure 2:
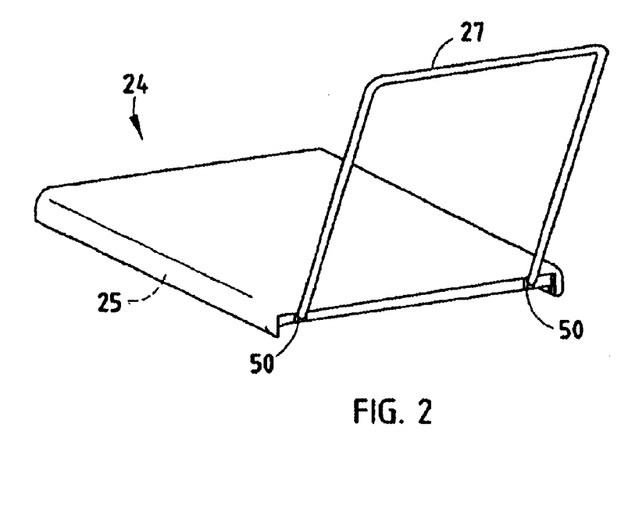
FIG. 2 is a perspective view of the top subassembly shown in FIG. 1, with the handle in its extended use position.
Figure 3:
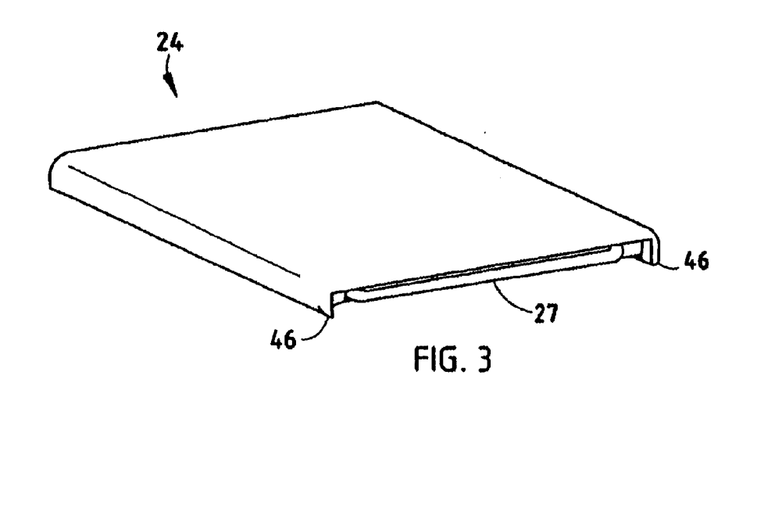
FIG. 3 is a perspective view of the top subassembly shown in FIG. 1, with the handle in a stored position.
Figure 4:
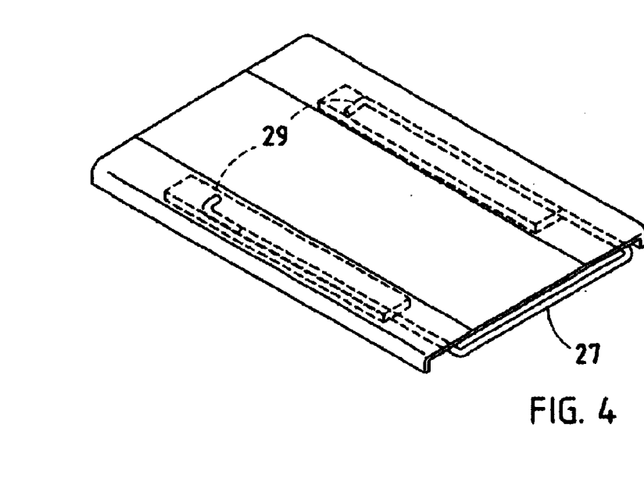
FIG. 4 is a bottom perspective view of the top subassembly shown in FIG. 2.
Figure 5:
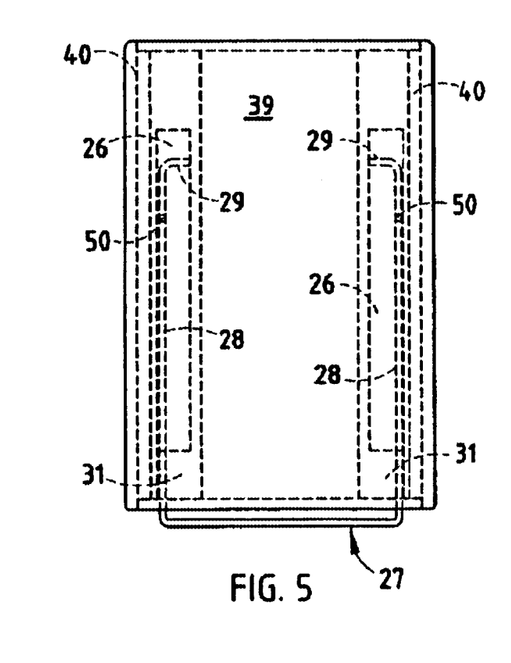
FIGS. 5–6 are bottom and end views of the top subassembly shown in FIG. 4.
Figure 6:
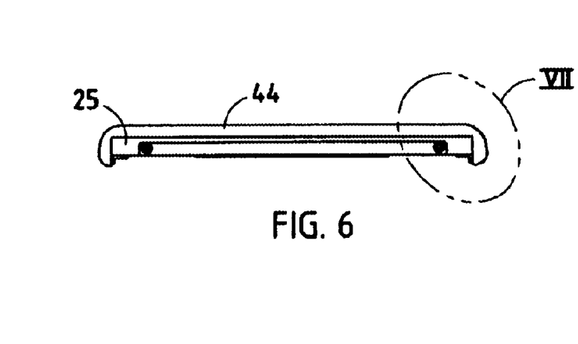

A mobile pedestal 20 (FIG. 1) includes a wheeled cabinet unit 21 with a cabinet 22, and castors 23 attached to a bottom thereof. A cushioned upholstery-covered top subassembly 24 is attached to a top of the wheeled cabinet unit 21. The top subassembly 24 includes a relatively flat panel-like housing 25 made of a wood product, such as medium-density fiberboard, that is shaped to substantially cover the top of the cabinet 22. The housing 25 defines a pair of spaced-apart elongated cavities 26. A U-shaped handle 27 has elongated legs 28 that extend into and slidably engage the cavities 26 so that the handle 27 is movable to an internal storage position in the cavities 26 (FIG. 3) and to an extended upwardly-angled use position (FIGS. 1–2). The legs 28 have a turned-in L-shaped end 29 that slides within an enlarged section 30 of the cavities 26, but that are configured to engage the narrower throat section 31 to retain the handle 27 to the housing 25. The L-shaped ends 29 and open end of the cavities 26 are configured to permit the handle 27 to rotate from a horizontal extended position to the angled use position when extended.

It is contemplated that the present invention will work with a variety of different cabinet units, including the illustrated cabinet unit 21. The illustrated cabinet unit 21 includes a cabinet 22 made of sheet metal, and includes a pair of drawers 33 and 34, at least one of which is lockable. Such constructions are known in the art and need not be described herein for an understanding of the present invention. A top of the cabinet unit 21 comprises a flat surface. Where the cabinet unit 21 includes the top subassembly 24 as part of the original construction, the top subassembly 24 can be attached to horizontal flanges at a top of the sidewalls of the cabinet unit 21. Where the cabinet unit 21 is a completed unit, the top subassembly 24 is attached to a flat top panel of the cabinet unit 21. The illustrated mobile pedestal 20 includes a pair of fixed-direction castors 23 and a pair of rotatable "steerable" castors that will rotate and assist in angularly steering the mobile pedestal 20 when moving it.

The top subassembly 24 is configured to stably rest on and be attached to the top of the cabinet unit 21. The top subassembly 24 is shown as having its handle 27 located on the same side as the front of the drawers 33 and 34. However, it is contemplated that the top subassembly 24 can be attached with the handle 27 facing an opposite direction or in another direction if desired. It is also contemplated that the subassembly 24 can be attached to a rear side of the cabinet unit 21 if desired. Other arrangements will become apparent to those skilled in this art, and it is not believed necessary to list all such variations herein.

Figure 7:
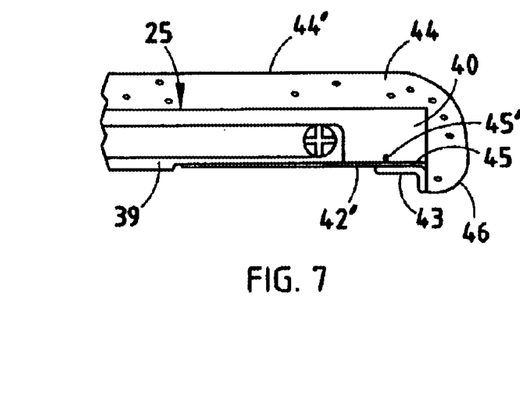
FIG. 7 is an enlarged view of the circled area VII in FIG. 6.

The housing 25 (FIGS. 4–7) includes a body made of a medium-density fiberboard. An advantage of the wood-product body is that it is engageable with screws or nails to securely retain the top subassembly 24 to the top of the cabinet unit 21. However, other materials can be used in place of the fiberboard, such as polymeric materials, metal materials, and composite materials. The housing 25 includes a center section 39 that provides an enlarged flat surface shaped to stably engage the flat top of the cabinet unit 21. The housing 25 further includes edge sections 40 having a flat surface slightly raised from the enlarged flat surface of the center section 39 to make room for a layer of upholstery 42 and for the L-shaped retainer 43 (FIG. 7). Thus when the upholstery 42 and retainer 43 are attached, the lowest surfaces of the subassembly 24 are basically coplanar, so that they stably engage the flat top of the cabinet unit 21. Alternatively, the upholstery 42 can be extended completely across a bottom of the housing 25. In both arrangements, the upholstery 42 holds the legs 28 and ends 29 within the cavities 26. Notably, it has been found to be an advantage to make the upholstery 42 light-transmissive so that an inspector can visually see the legs 28 operate in the cavities 26.

A cushion 44 is positioned on the body 38, and upholstery 44' is wrapped around the cushion 44, with edge sections 45 (FIG. 7) around the downwardly-extending edge lobes 46 of the cushion 44. The edges of upholstery 44' are held by retainers 43, and the edge sections 45 (and retainers 43) are retained by staples 45' extended into edge sections 40 of the body 38. The edge lobes 46 and retainers 43 engage sides of the cabinet to help retain the top subassembly 24 on the cabinet unit 21. It is contemplated that screws and/or adhesive can also be used for this purpose. It is noted that once the top subassembly 24 is attached to the cabinet unit 21, the top of the cabinet unit 21 closes the open side of the cavities 26 to form a rigid box with the body 38 to capture the handle 27 in the cavities 26, as described below.

Figures 8, 11:
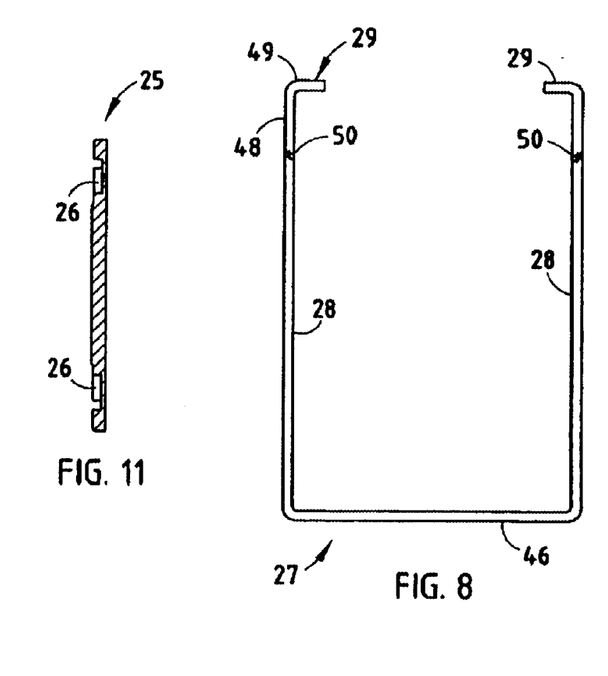
FIG. 8 is a top view of the handle shown in FIG. 5.
FIGS. 11–12 are cross sections taken along lines XI—XI and XII—XII in FIG. 9.
Figure 9:
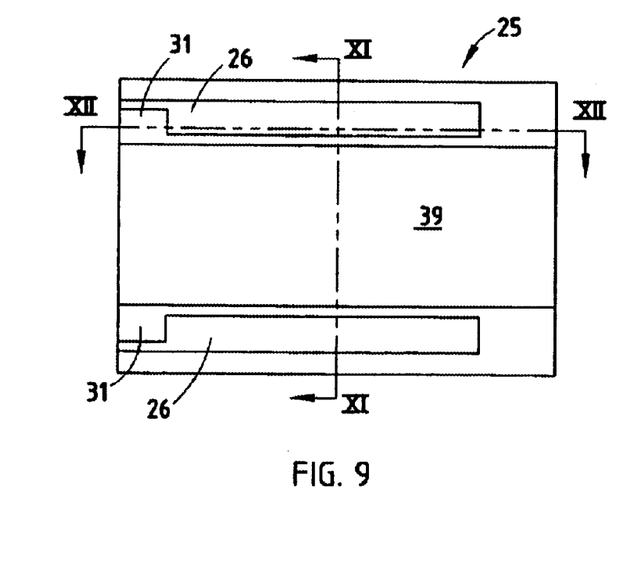
FIGS. 9–10 are bottom and end views of the body shown in FIG. 5.
Figure 10:
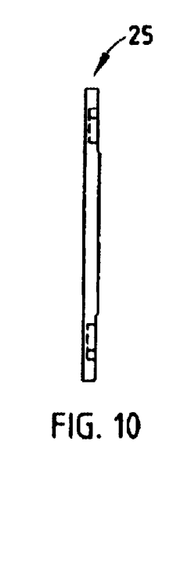
Figure 12:
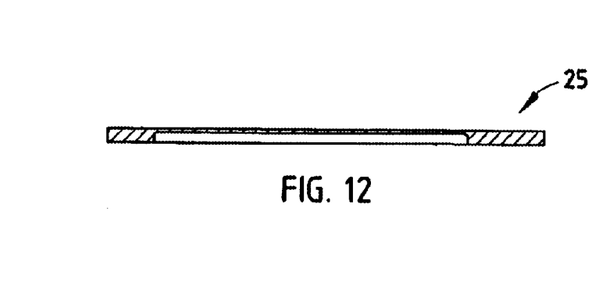

The handle 27 (FIG. 8) includes a U-shaped section 46 bent from wire, and further includes a pair of L-shaped end guides 29 that are pivotally attached at pivots 50 to the free ends of the U-shaped section 46. The L-shaped end guides 29 have a first leg segment 48 that is pivoted at pivots 50 to the U-shaped section 46, and a second leg segment 49 that extends laterally and inwardly. The second leg segment 49 extends a sufficient lateral distance to trap itself within the enlarged section 30 and to prevent the second leg segment 49 from sliding out of the enlarged section 30 into the narrower throat section 31. The first leg section 48 is slightly longer than a length of the narrower section 31, such that when the handle 27 is extended, the pivot 50 is located slightly outward from the top subassembly 24. (See FIG. 2.) This permits the handle 27 to be pivoted upwardly to its angled use position. It is noted that, if desired, detents can be included to hold the handle 27 in the angled extended position when it is released, but they are not required for good function.

An advantage of the present invention is that the top subassembly 24 can be retrofitted to existing mobile pedestals. This is highly advantageous, since many customers are not able to or do not want to purchase new mobile pedestals, yet they want the advantages and ergonomic and aesthetic features offered by the present top subassembly. Further, some office workers are using mobile pedestals not only for transporting items, but also for short-term resting and sitting. The present cushioned arrangement is adapted for such use.

Figure 13:
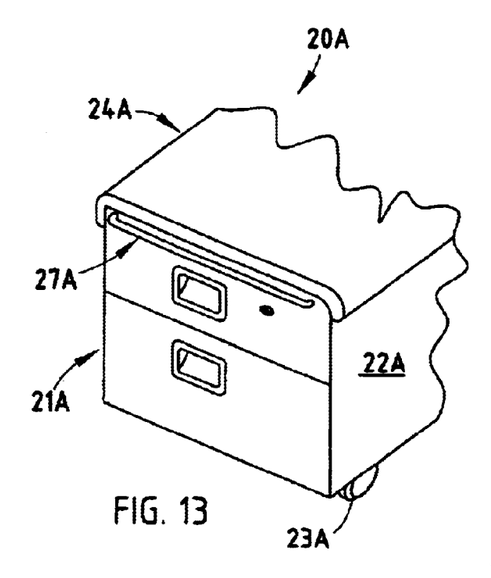
FIGS. 13–15 are perspective views of a mobile pedestal including a modified top subassembly embodying the present invention, the handle being stored in FIG. 13, partially extended in FIG. 14, and fully extended and angled in FIG. 15.
Figure 14:
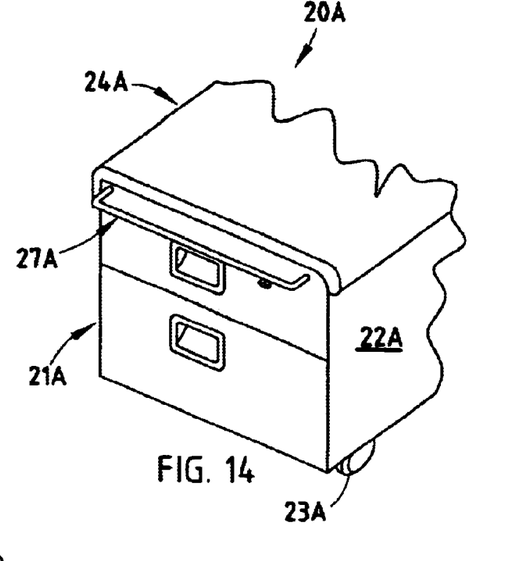
Figure 15:
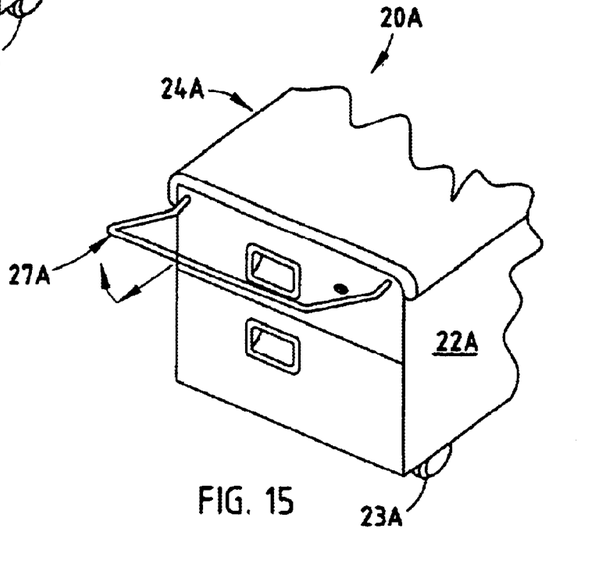

A modified mobile pedestal 20A is shown in FIGS. 13–15. The modified mobile pedestal 20A includes components that are identical or similar to the mobile pedestal 20, and the same numbers are used along with a letter "A" to identify the identical and similar components and features. This is done to reduce redundant disclosure herein, and not for another purpose.

Figures 16, 17, 18, 19:
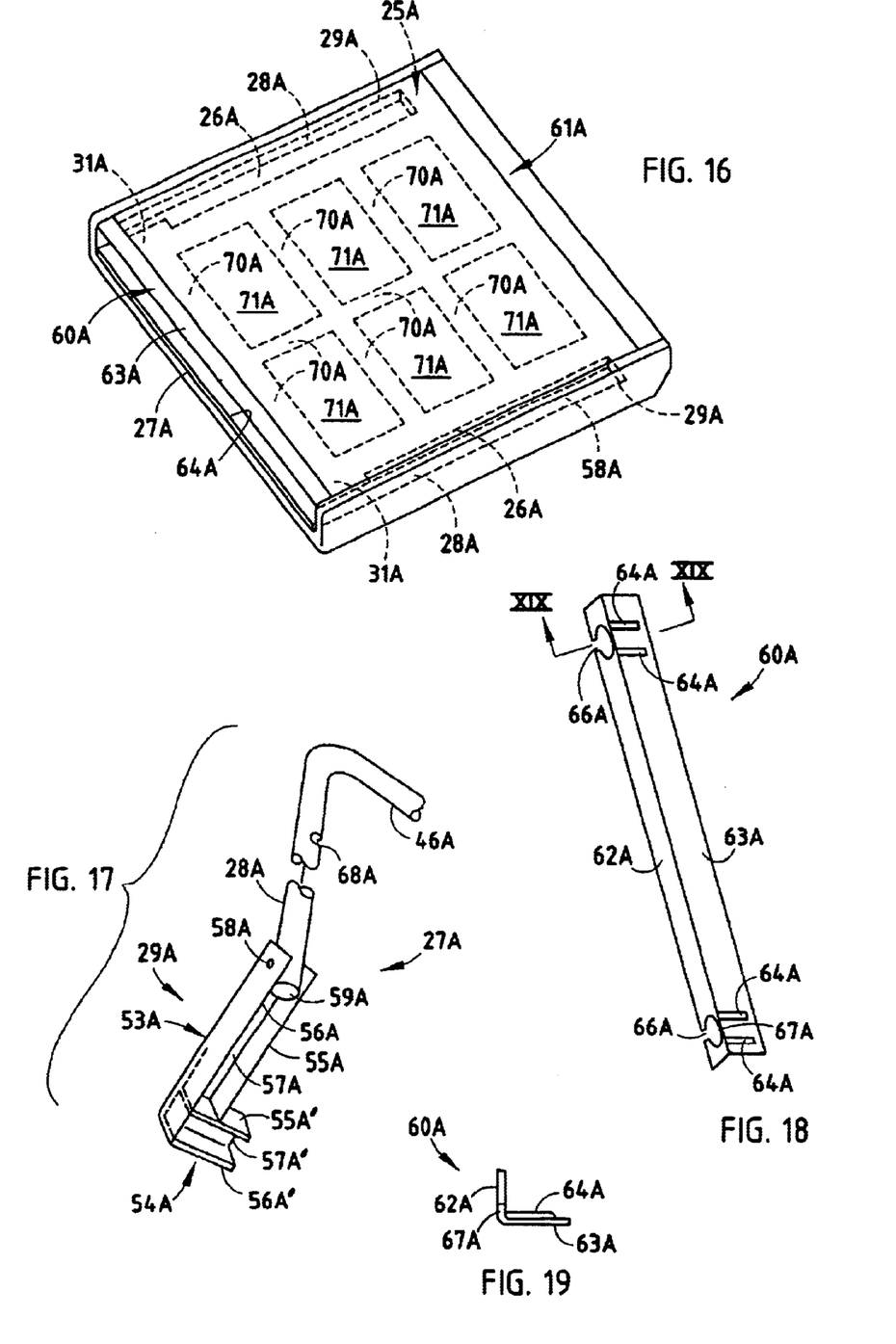
FIG. 16 is a bottom perspective view of the top subassembly of FIG. 13.
FIG. 17 is a fragmentary perspective view of the handle shown in FIG. 16.
FIG. 18 is a perspective view of an end piece for the top subassembly shown in FIG. 17.
FIG. 19 is a cross section taken along lines XIX—XIX in FIG. 18.
Figure 20:
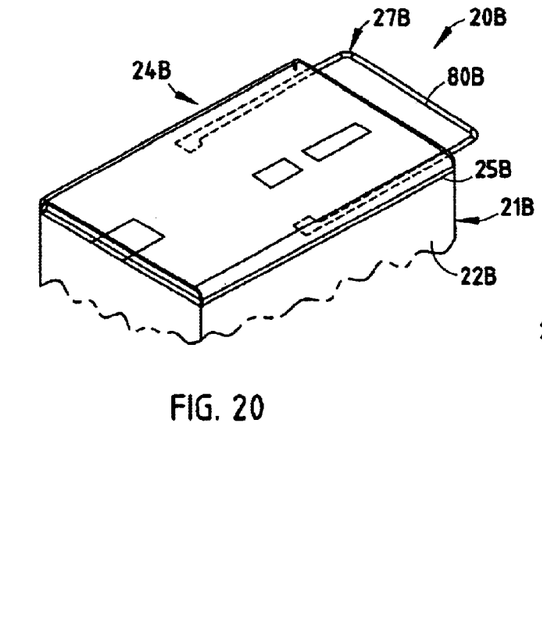
FIG. 20 is fragmentary perspective view of a modified wheeled mobile pedestal.
Figure 21:
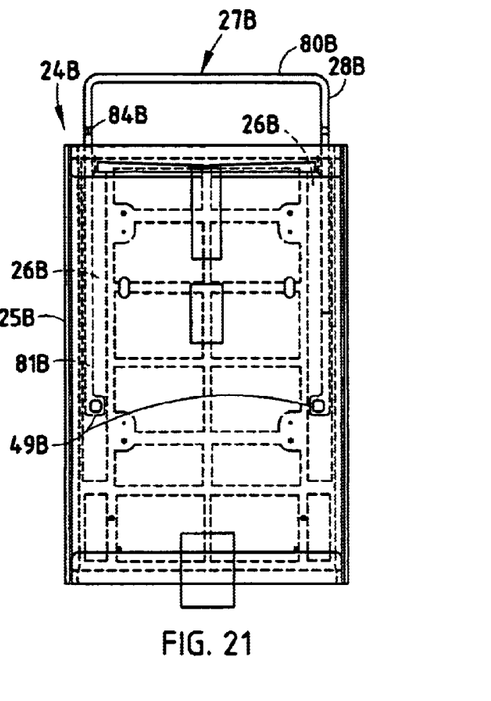
FIG. 21 is a bottom view of the top subassembly shown, including the handle.
Figure 22:
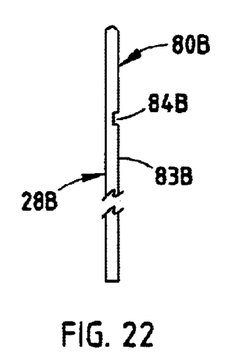
FIGS. 22 and 23 are fragmentary side and top views of a tubular bent metal member of the handle shown in FIG. 21.
Figure 23:
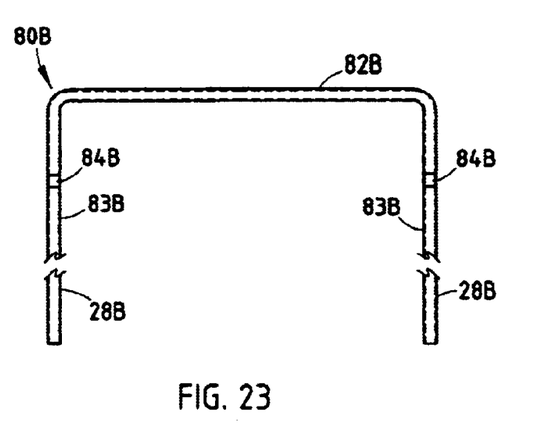

Specifically, the mobile pedestal 20A includes a wheeled cabinet unit 21A with a cabinet 22A, and castors 23A attached to a bottom thereof. A cushioned upholstery-covered top subassembly 24A attached to the wheeled cabinet unit 21A includes a relatively flat panel-like housing 25A (FIG. 16) made of a wood product shaped to substantially cover the top of the cabinet 22A. The housing 25A defines a pair of spaced-apart elongated cavities 26A, and the U-shaped handle 27A has elongated legs 28A that extend into and slidably engage the cavities 26A so that the handle 27A is movable to an internal storage position in the cavities 26A (FIG. 13), and to a partially extended position (FIG. 14), and to a fully-extended angled use position (FIG. 15).

Like the legs 28 of handle 27, the legs 28A (FIG. 17) have turned-in L-shaped ends or guides 29A that slide within an enlarged section 30A of the cavities 26A, but that are configured to engage the narrower section 31A to retain the handle 27A to the housing 25A. The L-shaped ends 29A, when in a fully extended position, are configured to permit the handle 27A to rotate from a horizontal extended position to the angled use position.

More specifically, the L-shaped ends 29A (FIG. 17) include a longitudinal section 53A and a perpendicular section 54A. The longitudinal section 53A has parallel side flanges 55A and 56A interconnected by a transverse flange 57A. The side flanges 55A–56A form a square or rectangular cross section that fits within the transverse shape of cavity 26A, and further the side flanges 55A–56A are relatively long, thus providing a uniform sliding motion that has less tendency to catch or bind within the cavity 26A as the handle 27A is slid between the retracted storage position and the extended use position. Further, the ends of the side flanges 55A and 56A extend slightly beyond the end of the transverse flange 57A, and the pivot pin 58A extends through the ends of the side flanges 55A and 56A proximate the end of the transverse flange 57A. This provides some shielding of the extreme end 59A of the free ends U-shaped section of the handle 27A. As a result, when the handle 27A is rotated between an extended horizontal position and the angled use position, the extreme ends 59A slide easily on an inside surface of the side flanges 55A and 56A and do not catch and grab on any part of the top subassembly 24A. The perpendicular section 54A includes side flanges 55A' and 56A' and transverse flange 57A'. The perpendicular section 54A extends fully across the wider part of the cavity 26A.

The illustrated top subassembly 24A includes a body 25A made of fiberboard and includes ribs 70A for strength and recesses 71A for light weight. It is preferable to provide reinforcement to the body 25A to prevent damage to the body 25A from abuse, such as may occur when the handle 27A is rapidly extended to a use position or is pulled with great force when in the use position. In top subassembly 24A, end pieces 60A and 61A are attached to front and rear ends of the body 25A. The end piece 60A (FIGS. 18–19) is illustrative of the end piece 61A, and accordingly only end piece 60A is described herein. The end piece 60A is L-shaped, and includes a vertical leg portion 62A and a horizontal leg portion 63A. The horizontal leg portion 63A attaches to a bottom surface of the body 25A. Two pairs of elongated embossments 64A are formed in the horizontal leg portion 63A for engaging, containing and guiding the rod-like legs 28A of the U-shaped section 46A of the handle 27A. The vertical leg portion 62A extends upwardly from horizontal leg portion 61A and includes apertures 66A shaped to receive the rod-like legs 28A. A lip 67A at a bottom of the vertical leg portion 62A (i.e. near horizontal leg portion 61A) is shaped to engage a notch 68A in the rod section 65A when the handle 27A is partially extended (FIG. 14). This advantageously provides a handle that can be partially extended and grasped for moving the mobile pedestal 20A while the handle 27A is still relatively close to the cabinet 22, which is preferable in some instances. It is noted that this same feature can be incorporated into the mobile pedestal 20.

A modified mobile pedestal 20B is shown in FIGS. 20–26. The modified mobile pedestal 20B includes components that are identical or similar to the mobile pedestals 20 and 20A, and the same numbers are used along with a letter "B" to identify the identical and similar components and features. This is done to reduce redundant disclosure and discussion herein, and not for another purpose.

Specifically, the mobile pedestal 20B includes a wheeled cabinet unit 21B having a cabinet 22B with castors attached to a bottom thereof. A cushioned upholstery-covered top subassembly 24B attached to a top of the wheeled cabinet unit 21B includes a relatively flat panel-like housing 25B (FIG. 20) made of a wood product shaped to substantially cover the top of the cabinet 22B. The housing 25B defines a pair of spaced-apart elongated cavities 26B, and the U-shaped handle 27B has elongated legs 28B that extend into and slidably engage the cavities 26B so that the handle 27B is movable to an internal storage position in the cavities 26B, a partially extended position, and to a fully-extended angled up position.

The handle 27B (FIG. 24) includes a U-shaped bent tubular member 80B, and a resilient material 81B that fills the internal cavity within the tubular member 80B and that extends to form the legs, as described below. The tubular member 80B (FIGS. 22–23) is U-shaped, and includes a grip portion 82B and parallel side portions 83B. A notch 84B is formed in each of the side portions 83B at a location a few inches from but near grip portion 82B. The side portions 83B extend through holes in a bracket 85B. The bracket 85B has an L-shaped cross section configured for secure attachment to a top of the cabinet unit 21B, and includes a vertical flange 86B. The notches 84B are shaped to engage the flange 86B with a detent action to hold the handle 27B in a partially extended position. The handle 27B can be lifted and slid inwardly to a fully-recessed stored position, or outwardly to a partially extended position, or to a fully extended horizontal position, or pivoted to an upwardly-pivoted, raised position (similar to FIGS. 13–15).

The handle 27B (FIG. 24) is unique in that it includes a U-shaped bent tubular member 80B filled with the resilient material 81B insert-molded into the member 80B. The resilient material 81B is a material such as polypropylene, having good strength and stiffness, yet some flexibility. The material 81B partially fills the area of notch 84B, but leaves a portion of the notch for engagement by the flange 86B.

Figure 24:
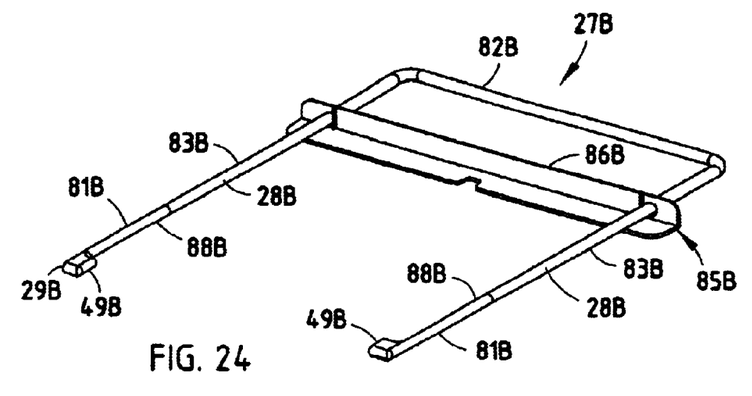
FIGS. 24–26 are perspective, side and top views of the handle of FIG. 21 and a bracket of the top subassembly of FIG. 21, the bracket being configured to engage a notch in the handle, the handle including the tubular metal member shown in FIGS. 22–23 and also including a resilient material filling the tubular metal member with leg portions extending for sliding contact with a body of the top subassembly.
Figure 25:
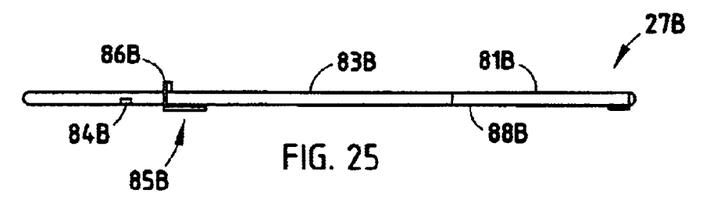
Figure 26:
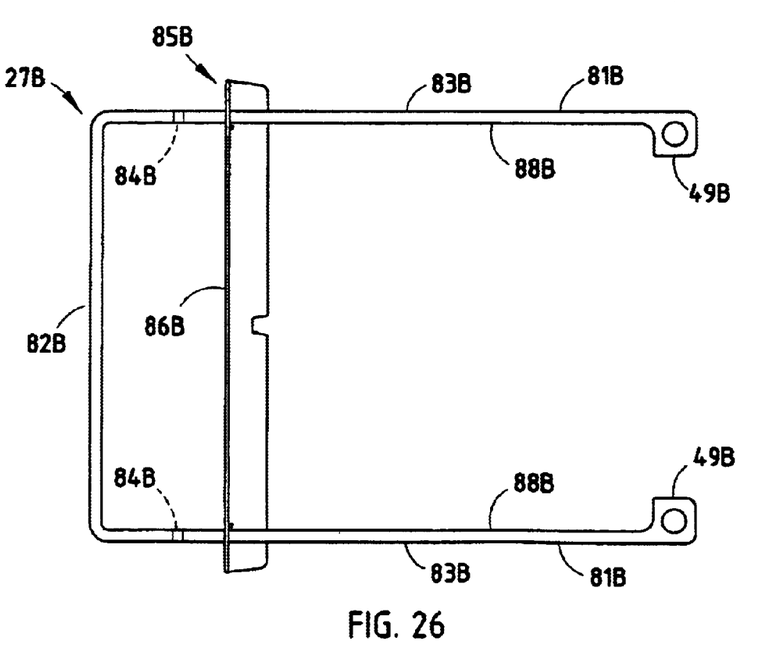

A portion of the material 81B extends axially from the ends of the legs of the U-shaped tubular member 80B to form guides 29B that slidably engage the cavities 26B. The guides 29B include inward flanges 49B to provide better tracking within the cavities 26B, and further the inward flanges 49B help retain the handle 27B within the housing 25B of the top subassembly 24B by engagement with material at the ends of the cavities 26B. The sections 88B of resilient material near the ends of the tubular member 80B are sufficiently flexible to form a living hinge that allows the handle 27B to flex between the horizontal and angled positions of the handle 27B. It is contemplated that the sections 88B can be necked down to form a well-defined living hinge, if desired, but it is contemplated that this will not be necessary.

In the foregoing description, those skilled in the art will readily appreciate that modifications may be made to the invention without departing from the concepts disclosed herein. Such modifications are to be considered as included in the following claims, unless these claims by their language expressly state otherwise.

The invention claimed is:

1. A mobile pedestal comprising:
   a wheeled cabinet unit; and
   a top subassembly attached to a top of the wheeled cabinet unit, the top subassembly including a housing shaped to cover the top of the cabinet unit and that defines at least one cavity, the top subassembly further including a handle operably attached to the housing and configured for movement to an internal storage position in the at least one cavity and to an extended use position for use;
   wherein the cavity opens toward the cabinet and is closed by structure on the cabinet.

2. The pedestal defined in claim 1, wherein the internal storage position positions the handle in a horizontal position.

3. The pedestal defined in claim 1, including a cushion positioned on and attached to the top subassembly.

4. The pedestal defined in claim 1, wherein the at least one cavity includes two horizontally-elongated parallel cavities.

5. The pedestal defined in claim 1, wherein the top subassembly includes a body made of wood product that defines the at least one cavity.

6. The pedestal defined in claim 1, wherein the handle, when in the extended use position, is pivotable between a raised position and a lowered position.

7. The pedestal defined in claim 1, including a flexible sheet attached to a bottom of the housing, the flexible sheet holding the handle in the at least one cavity.

8. The mobile pedestal defined in claim 1, wherein the handle includes a grip portion and a section of resilient material connecting the grip portion to the top subassembly for supporting pivotal movement of the handle.

9. A mobile pedestal comprising:
   a wheeled cabinet unit; and
   a top subassembly attached to a top of the wheeled cabinet unit, the top subassembly including a housing shaped to cover the top of the cabinet unit and that defines at least one cavity, the top subassembly further including a handle operably attached to the housing and configured for movement to an internal storage position in the at least one cavity and to an extended use position for use;
   wherein the at least one cavity includes two horizontally-elongated parallel cavities;
   wherein further the parallel cavities open downwardly toward the cabinet unit.

10. The pedestal defined in claim 9, wherein the top subassembly includes a body and a sheet attached to a bottom of the body for closing the two parallel cavities to retain the handle therein.

11. The pedestal defined in claim 10, wherein the sheet is light-transmissive and permits visual access to the handle, even when the handle is in the storage position, for seeing operation of the handle during manufacture and after assembly of the top subassembly.

12. A mobile pedestal comprising:
   a wheeled cabinet unit; and
   a top subassembly attached to a top of the wheeled cabinet unit the top subassembly including a housing shaned to cover the top of the cabinet unit and that defines at least one cavity, the top subassembly further including a handle operably attached to the housing and configured for movement to an internal storage position in the at least one cavity and to an extended use position for use;
   wherein the at least one cavity includes two horizontally-elongated parallel cavities;
   wherein further the handle includes a U-shaped handle member and further includes end guides that slidably engage the parallel cavities to facilitate extending and retracting the handle.

13. The pedestal defined in claim 12, wherein the U-shaped handle member is pivoted to the end guides.

14. The pedestal defined in claim 13, wherein the end guides are L-shaped and have a first arm shaped to engage one of the parallel cavities to prevent the handle from coming out of the cavities, and further have a second arm that is elongated and extends longitudinally along the one cavity.

15. The pedestal defined in claim 14, wherein the end guides are pivoted to the U-shaped handle member at a pivot location, and wherein the cavities and the end guides are shaped to position the pivot location outside of the cavities when the handle is in the extended use position.

16. A mobile pedestal comprising:
   a wheeled cabinet unit; and
   a top subassembly attached to a top of the wheeled cabinet unit, the top subassembly including a housing shaped to cover the top of the cabinet unit and that defines at least one cavity, the top subassembly further including a handle operably attached to the housing and configured for movement to an internal storage position in the at least one cavity and to an extended use position for use;
   wherein the handle is further movable to an intermediate use position where the handle is only partially extended but extends sufficiently for use.

17. The pedestal defined in claim 16, wherein the handle and cavity include a detent for holding the handle in the intermediate use position.

18. A mobile pedestal comprising:
   a wheeled cabinet unit including a cabinet made from sheet metal; and
   a top subassembly attached to a top of the wheeled cabinet unit, the top subassembly including a housing made of a wood product or polymeric material, and being shaped to substantially cover the top of the cabinet unit, the housing defining at least one elongated cavity, the top subassembly further including a handle with elongated legs that extend into and slidably engage the at least one elongated cavity, the handle being operably attached to the housing and configured for movement to an internal storage position in the at least one cavity and to an extended use position, the legs having an end member and the at least one cavity being configured to engage the end member to retain the handle to the housing when the handle is in the extended use position but to permit the handle to rotate upwardly when in the extended use position;
   wherein the end member includes an end guide that slidably engages the at least one elongated cavity.

19. A mobile pedestal comprising:
   a wheeled cabinet unit;
   a top subassembly attached to the wheeled cabinet unit; and a handle attached to the top subassembly, the handle including flexible material that bends as the handle is moved between a raised position and a lowered position;

wherein the handle has a tubular shape, and wherein the flexible material is insert-molded into and fills an elongated portion of the tubular shape.

20. A mobile pedestal comprising:

a wheeled cabinet unit;

a top subassembly attached to the wheeled cabinet unit; and a handle attached to the top subassembly, the handle including flexible material that bends as the handle is moved between a raised position and a lowered position;

wherein the handle comprises a tubular shape with a notch, and wherein the flexible material at least partially fills the notch, and wherein the top subassembly includes a protruding flange adapted to engage the notch to hold the handle in a partially extended position where the handle extends only a short distance from the cabinet unit.

21. A subassembly configured for attachment to a wheeled cabinet unit, the subassembly comprising:

a housing having a cabinet interfacing side that is adapted to stably engage and cover a portion of the cabinet unit, the housing defining at least one cavity; and a handle operably attached to the housing and configured for movement to an internal storage position in the at least one cavity and to an extended use position extending from the cavity;

wherein the handle includes a grip portion and a section of resilient material connecting the grip portion to the subassembly for supporting pivotal movement of the handle.

22. A mobile pedestal comprising:

a wheeled cabinet unit including a cabinet made from sheet metal; and a top subassembly attached to a top of the wheeled cabinet unit, the top subassembly including a housing made of a wood product or polymeric material, and being shaped to substantially cover the top of the cabinet unit, the housing defining at least one elongated cavity, the top subassembly further including a handle with elongated legs that extend into and slidably engage the at least one elongated cavity, the handle being operably attached to the housing and configured for movement to an internal storage position in the at least one cavity and to an extended use position, the legs having an end member and the at least one cavity being configured to engage the end member to retain the handle to the housing when the handle is in the extended use position but to permit the handle to rotate upwardly when in the extended use position;

wherein the handle includes a grip portion and a section of resilient material connecting the grip portion to the top subassembly for supporting pivotal movement of the handle.

\* \* \* \* \*